United States Patent
Zimmel et al.

(10) Patent No.: US 8,041,177 B2
(45) Date of Patent: Oct. 18, 2011

(54) FIBER OPTIC DUST CAP AND DUST PLUG WITH HIGH POWER PROTECTION

(75) Inventors: Steven C. Zimmel, Minneapolis, MN (US); Yu Lu, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 64 days.

(21) Appl. No.: 12/505,864

(22) Filed: Jul. 20, 2009

(65) Prior Publication Data

US 2010/0074588 A1    Mar. 25, 2010

Related U.S. Application Data

(63) Continuation of application No. 11/758,319, filed on Jun. 5, 2007, now Pat. No. 7,565,053.

(51) Int. Cl.
*G02B 6/00* (2006.01)
*G02B 6/36* (2006.01)

(52) U.S. Cl. .............. 385/139; 385/53; 385/76; 385/88; 385/92; 385/93; 385/134; 385/147

(58) Field of Classification Search ............. 385/53, 385/76, 88, 92, 93, 134, 139, 147
See application file for complete search history.

(56) References Cited

U.S. PATENT DOCUMENTS

| | | | |
|---|---|---|---|
| 6,188,825 B1 | 2/2001 | Bandy et al. | |
| 6,227,717 B1 | 5/2001 | Ott et al. | |
| 6,554,485 B1 | 4/2003 | Beatty et al. | |
| 6,634,798 B2 | 10/2003 | Cheng | |
| 7,164,840 B2 | 1/2007 | Hsieh | |
| 7,274,843 B2 | 9/2007 | James, IV et al. | |
| 7,329,049 B2 | 2/2008 | Meek et al. | |
| 7,349,619 B2 | 3/2008 | Beck et al. | |
| 7,389,024 B2 | 6/2008 | Oron et al. | |
| 7,565,053 B2 | 7/2009 | Zimmel et al. | |
| 2002/0090180 A1* | 7/2002 | Silverbrook | 385/92 |
| 2003/0002810 A1 | 1/2003 | Cheng | |
| 2003/0123812 A1* | 7/2003 | Beatty et al. | 385/72 |
| 2005/0053332 A1* | 3/2005 | Doerr | 385/37 |
| 2005/0135772 A1 | 6/2005 | Nield et al. | |
| 2007/0183716 A1* | 8/2007 | Suzuki et al. | 385/33 |
| 2007/0217749 A1 | 9/2007 | Jong et al. | |

OTHER PUBLICATIONS

Two photographs of what is believed to be a commercial embodiment similar to the adapter plug disclosed by U.S. Patent Application Publication No. US 2007/0217749, filed Mar. 14, 2006.

XGLO™ Jumpers & Pigtails, Siemon, 2 pages (Copyright 2005).

* cited by examiner

*Primary Examiner* — Ryan Lepisto
*Assistant Examiner* — Jerry Blevins
(74) *Attorney, Agent, or Firm* — Merchant & Gould P.C.

(57) ABSTRACT

A dust cap and a dust plug for installation with optical fiber connectors and optical fiber adapters respectively. The dust cap and the dust plug have features that protect an optical interface on the optical fiber connector and the optical fiber adapter from contamination. At least an exterior portion of the dust cap and the dust plug illuminate when installed on the optical fiber connector and the optical fiber adapter terminating an optical fiber transmitting visible light. The dust cap and the dust plug have features that reduce the intensity of a high power optical signal emitted from the optical fiber terminated by the optical fiber connector and optical fiber adapter. A first embodiment diffracts the optical signal, thereby reducing its intensity. A second embodiment disburses the optical signal, thereby reducing its intensity. A third embodiment absorbs high power frequencies of the optical signal and transmits certain visible frequencies. The dust cap and the dust plug function as a safe, visual fiber optic circuit continuity detector.

20 Claims, 15 Drawing Sheets

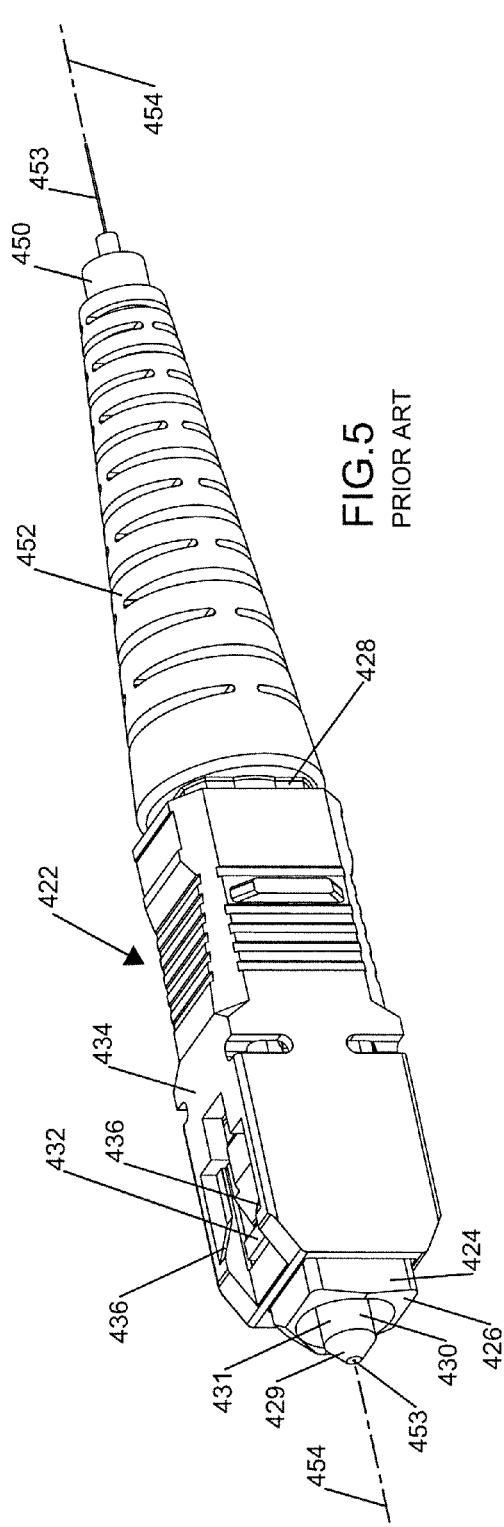
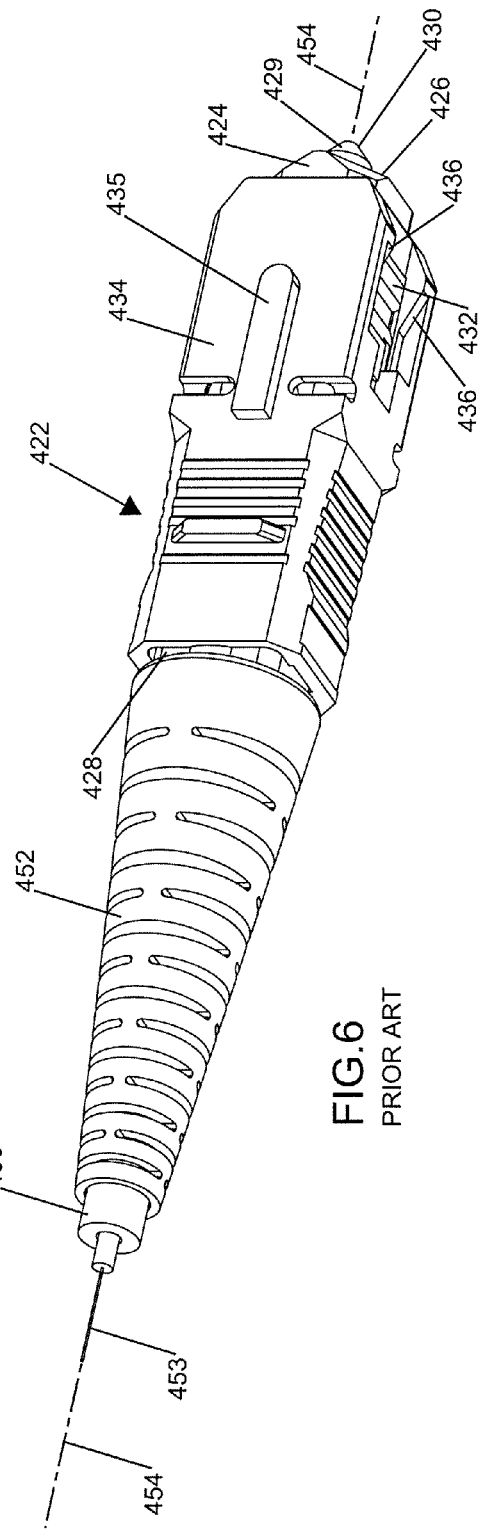
FIG. 5
PRIOR ART
FIG. 6
PRIOR ART

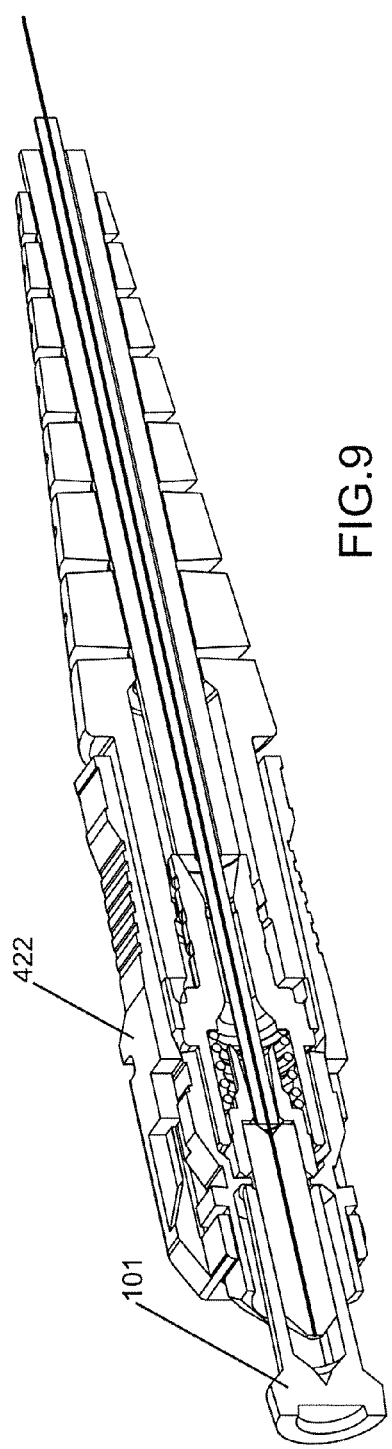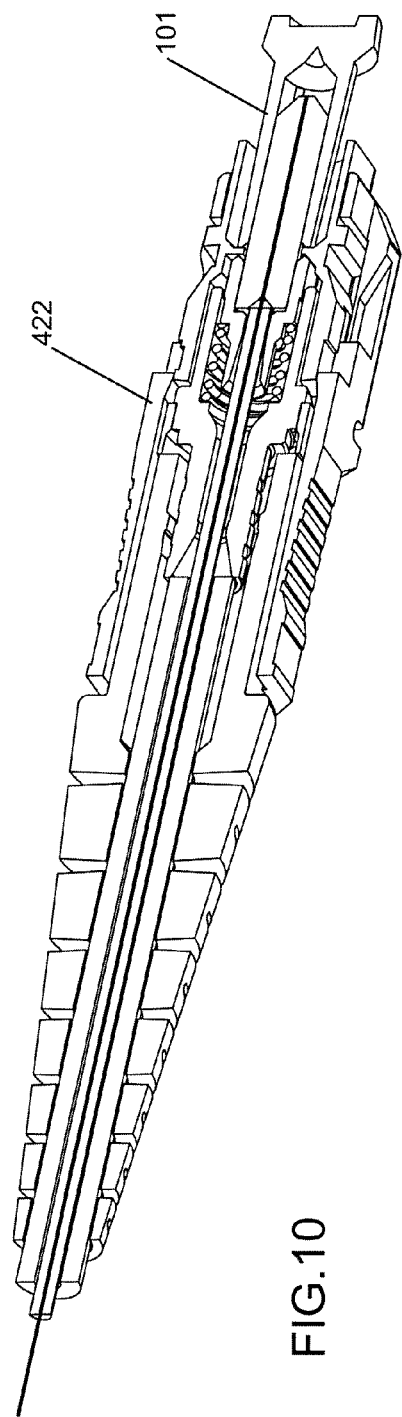

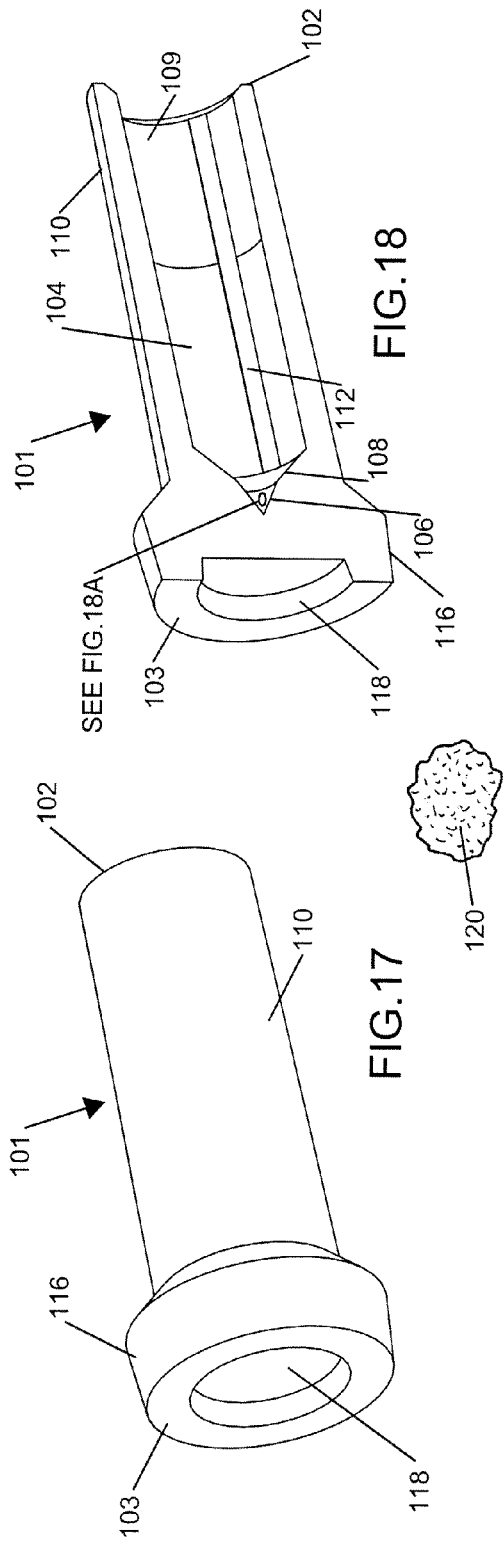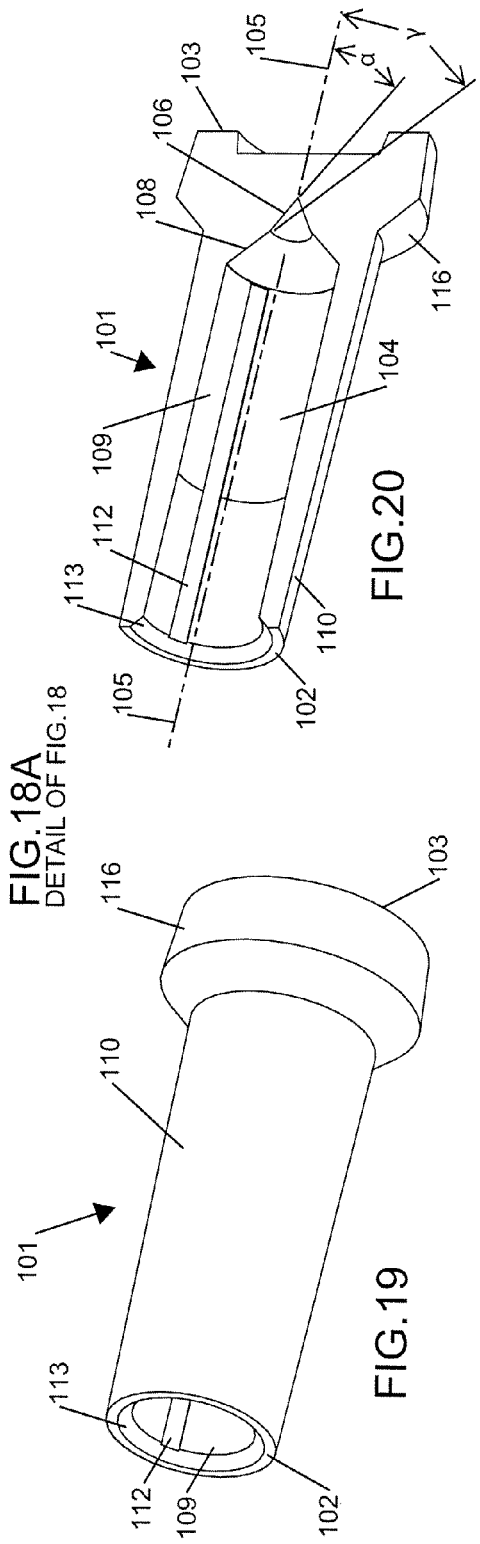

FIBER OPTIC DUST CAP AND DUST PLUG WITH HIGH POWER PROTECTION

CROSS-REFERENCE TO RELATED APPLICATION

This application is a continuation of U.S. patent application Ser. No. 11/758,319, filed Jun. 5, 2007, now U.S. Pat. No. 7,565,053, which application is hereby incorporated by reference in its entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter generally includes an internal split sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next creating an optical interface. The adapter also typically has a mechanical fastening arrangement (e.g., a snap-fit arrangement) for mechanically retaining the fiber optic connectors within the adapter.

FIGS. 23 through 26 show a prior art SC style adapter 320 that is frequently used in fiber optic telecommunications systems. The SC style adapter 320 includes a housing 321 having an outer portion 322 defining first and second oppositely positioned ports 324, 326. Resilient fingers 328 are provided on the outer portion 322 for use in retaining the adapter 320 within a mounting opening (e.g., an opening within a panel) by a snap fit connection. Keying slots 323 are provided on the outer portion 322 to ensure proper rotational alignment of the adapter 320 to the fiber optic connectors which may be positioned within the ports 324, 326. The housing 321 also includes an inner portion 330 positioned within the outer portion 322. The inner portion 330 includes a cylindrical split sleeve holder 332 in which a split sleeve 334 is mounted. The split sleeve 334 has a first end 336 accessible from the first port 324 and a second end 338 accessible from the second port 326. The inner portion 330 also includes a first pair of resilient latches 340 positioned at the first port 324 and a second pair of resilient latches 342 positioned at the second port 326.

FIGS. 5 and 6 show a prior art SC style fiber optic connector 422 that is compatible with the adapter 320. The connector 422 includes a connector body 424 in which a ferrule assembly is mounted. The connector body 424 includes a first end 426 positioned opposite from a second end 428. The first end 426 provides a connector interface at which a ferrule 430 of the ferrule assembly is supported. Adjacent the first end 426, the connector body 424 includes retention shoulders 432 that are engaged by the resilient latches 340 of the adapter 320 when the connector 422 is inserted in the first port 324 of the adapter 320, or that are engaged by the resilient latches 342 when the connector 422 is inserted in the second port 326 of the adapter 320. The latches 340, 342 function to retain SC connectors the within their respective ports 324, 326. The second end 428 of the connector body 424 is adapted to receive a fiber optic cable 450 having a fiber 453 that terminates in the ferrule 430. A resilient boot 452 can be positioned at the second end 428 of the connector body 424 to provide bend radius protection at the interface between the connector body 424 and the fiber optic cable 450.

The connector 422 also includes a retractable release sleeve 434 that mounts over the connector body 424. The release sleeve 434 can be slid back and forth relative to the connector body 424 through a limited range of movement that extends in a direction along a longitudinal axis 454 of the connector 422. The release sleeve 434 includes release ramps 436 that are used to disengage the latches 340, 342 from the retention shoulders 432 when it is desired to remove the connector 422 from a given one of the ports 324, 326. For example, by pulling back (i.e., in a direction toward the second end 428 of the connector body 424) on the retention sleeve 434 while the connector 422 is mounted in a given port 324, 326, the release ramps 436 force the corresponding latches 340, 342 apart from one another a sufficient distance to disengage the latches 340, 342 from the retention shoulders 432 so that the connector 422 can be removed from the port 324, 326. The release sleeve 434 includes a keying rail 435 that fits within either one of the keying slots 323 of the outer portion 322 of the housing 321 to ensure proper rotational alignment of the connector 422 within the adapter 320. When two of the connectors 422 are latched, one each within the ports 324, 326 of the adapter 320, the ferrules 430 of the connectors 422 fit within the first and second ends 336, 338 of the split sleeve 334 and are thereby held in co-axial alignment with one another. Further details regarding SC type fiber optic connectors are disclosed at U.S. Pat. No. 5,317,663, that is hereby incorporated by reference in its entirety.

As shown in FIGS. 1 through 4, when coupled together in a functional configuration, two of the connectors 422 and the adapter 320 provide the optical interface protection from contamination. In particular, the overlapping fit of the ports 324, 326 of the housing 321 around the connectors 422 provide a first layer of protection to the optical interface. In addition, the fit of the cylindrical split sleeve holder 332 and the split sleeve 334 around the ferrules 430 provides a second layer of protection. When either of the connectors 422 is disconnected from the adapter 320, the configuration of FIGS. 1 through 4 is split into the lone connector 422, shown in FIGS. 5 and 6, and the adapter 320 with the remaining connector 422 assembled, as illustrated in FIGS. 27 and 28. This leaves the disconnected optical interface exposed to contamination at two locations. The first location is around the ferrule 430 on the lone connector 422. The second location is around and in the split sleeve holder 332 within the open port 324 or 326 of the adapter 320 (with the remaining connector 422 assembled). The optical interface is sensitive to contamination. If the optical interface is contaminated, the fiber optic signal connection may be disrupted upon reconnection.

When two of the connectors 422 and the adapter 320 are coupled together, in a functional configuration, as shown in FIGS. 1 through 4, the fiber optic signal, if present, is contained within the fiber optic cable 450, the connectors 422, and the adapter 320. When a fiber optic signal is transmitted through the fiber optic cable 450 terminated only by the connector 422, as shown in FIGS. 5 and 6, the signal will not be contained and will be emitted as a beam into the environment. Likewise, when a fiber optic signal is transmitted through the fiber optic cable 450 terminated only by the connector 422 assembled to the adapter 320, as illustrated in FIGS. 27 and 28, the signal will not be contained and will be emitted as a beam into the environment. Beam emitting configurations, such as those illustrated in FIGS. 5, 6, 27, and 28, may occur during the construction of a new fiber optic network, when various connections are being established; during testing and diagnosis of an existing fiber optic network, when connections and disconnections are being performed; within an operational fiber optic network, with provisions for expansion that include unused connections; and other instances. When high power signals (e.g., above 0.25 Watt) are involved, light emitted from the fiber optic network can be a safety concern.

A common practice for testing and diagnosing fiber optic connections and networks involves transmitting visible light through the fiber optic cable 450. In certain cases, where only non-visible light is normally used within a cable 450, a low power visible light source replaces the non-visible light source. Upon seeing visible light at the endpoint of a series of connections, the continuity of the optical circuit is assured. Intermediate connections can be disconnected to visually verify the continuity up to that point. A typical opaque dust cap or dust plug prevents visual continuity detection when properly installed on a corresponding connector 422 or adapter 320.

Temporarily removing the dust cap or dust plug allows visual continuity detection to proceed. Transparent and translucent dust caps and dust plugs have been devised that allow visual continuity testing to occur with the dust cap or dust plug installed on the corresponding connector 422 or adapter 320. Certain optical circuits employ high power (above 0.25 Watt) laser signals in the visible and non-visible spectrum.

Attempting visual continuity detection may be unsafe and result in eye damage when high power signals are involved and the dust cap or the dust plug has been removed. Furthermore, transparent and translucent dust caps and dust plugs may also be unsafe when high power signals are involved. There is a need for a dust cap and a dust plug that allow safe, visual continuity detection to occur with the dust cap and the dust plug installed on the corresponding connector 422 and adapter 320. Furthermore, the dust cap and the dust plug need to provide protection from any high power signal which may be present in the cable 450 terminated by the connector 422 and the dust cap or the adapter 320 and the dust plug.

SUMMARY

One aspect of the present disclosure relates to a transparent or translucent dust cap and a transparent or translucent dust plug that allow safe, visual fiber optic circuit continuity detection when properly installed on a fiber optic connector or a fiber optic adapter respectively. In addition, protection from high power signals is provided. One technique for achieving these goals employs a textured light disbursing surface, within the dust cap or the dust plug, which disburses the light transmitted through the dust cap and the dust plug resulting in non-harmful intensities of emerging light. In addition, the textured light disbursing surface may be set at an angle to the light source and may take the overall shape of a cone. A second technique employs a light refracting surface, within the dust cap and the dust plug, that is angled to the light source and may also take the shape of a cone. Light transmitted through the dust cap or the dust plug are thereby refracted and reflected reducing the intensity. A third technique employs a dopant added to the dust cap and the dust plug material resulting in absorption of high-power power frequencies while allowing transmission of at least certain safe, low-power, visible frequencies. The above techniques can be combined in various combinations.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 5 is a front, top perspective view of the prior art SC style fiber optic connector of FIG. 1;

FIG. 6 is a rear, bottom perspective view of the fiber optic connector of FIGS. 1 and 5;

FIG. 9 is a front, top perspective cut-away view cut lengthwise through the fiber optic connector of FIGS. 1 and 5 with the dust cap of FIG. 7 installed;

FIG. 10 is a rear, bottom perspective cut-away view cut lengthwise through the fiber optic connector of FIGS. 1 and 5 with the dust cap of FIG. 7 installed;

FIG. 17 is an enlarged, front, top perspective view of the dust cap of FIG. 7;

FIG. 18 is an enlarged, front, top perspective cut-away view cut lengthwise through the dust cap of FIG. 7;

FIG. 18A is a greatly enlarged view illustrating an optional randomly textured light disbursing surface within the dust cap of FIGS. 7 and 18;

FIG. 19 is an enlarged, rear, bottom perspective view of the dust cap of FIG. 7;

FIG. 20 is an enlarged, rear, bottom perspective cut-away view cut lengthwise through the dust cap of FIG. 7;

DETAILED DESCRIPTION

Figure 1:
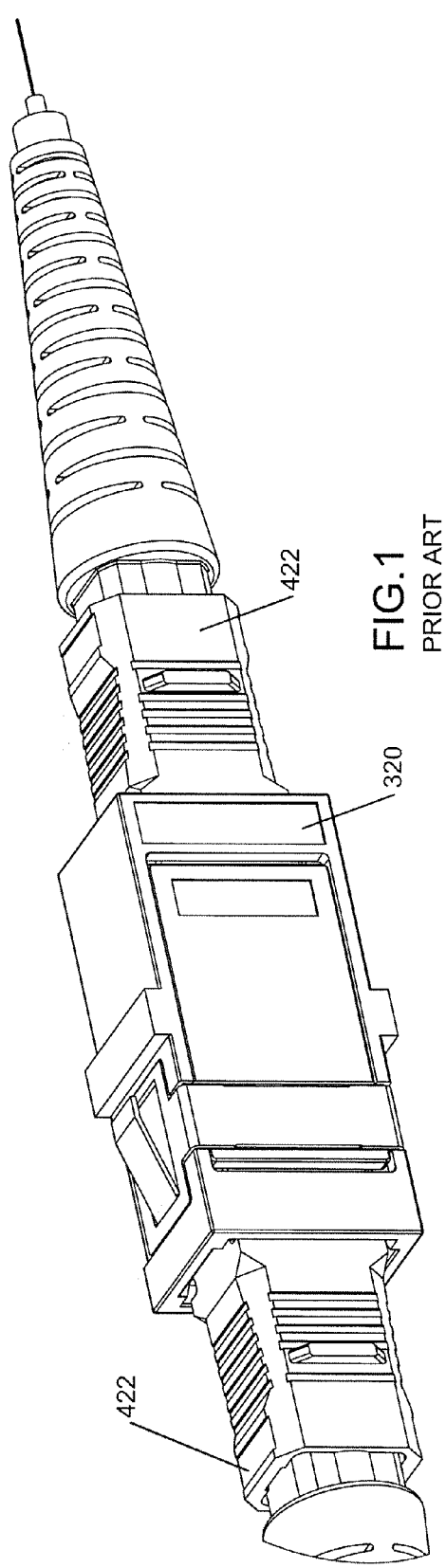
FIG. 1 is a front, top perspective view of two prior art SC style fiber optic connectors assembled with a prior art SC style fiber optic adapter, thereby forming an optical connection.
Figure 2:
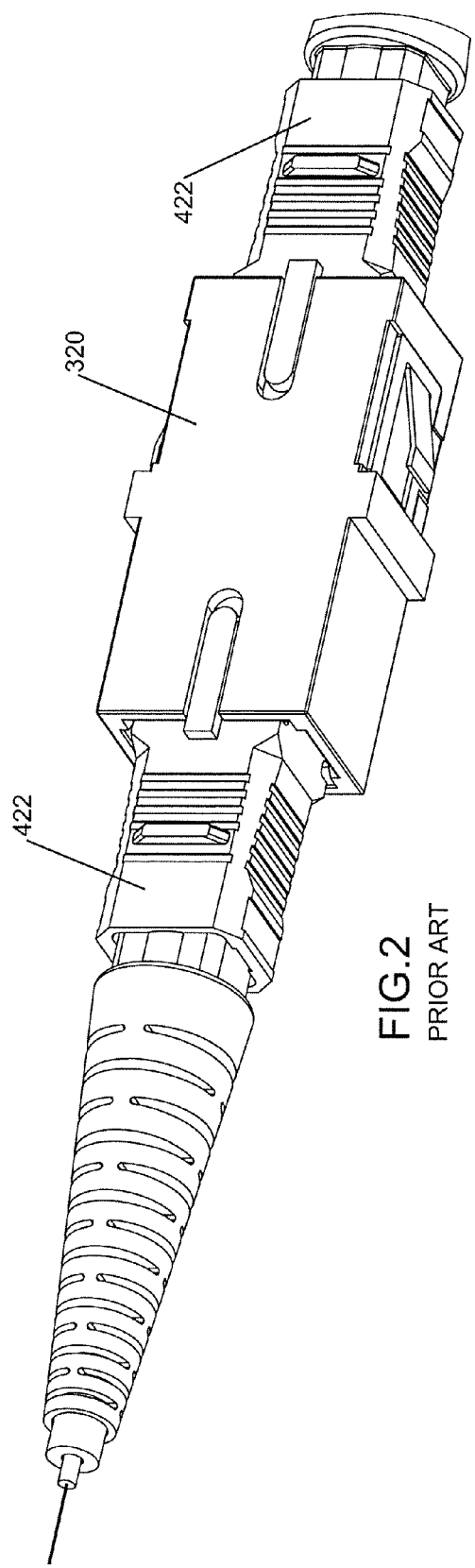
FIG. 2 is a rear, bottom perspective view of the two fiber optic connectors of FIG. 1 assembled with the fiber optic adapter of FIG. 1.
Figure 3:
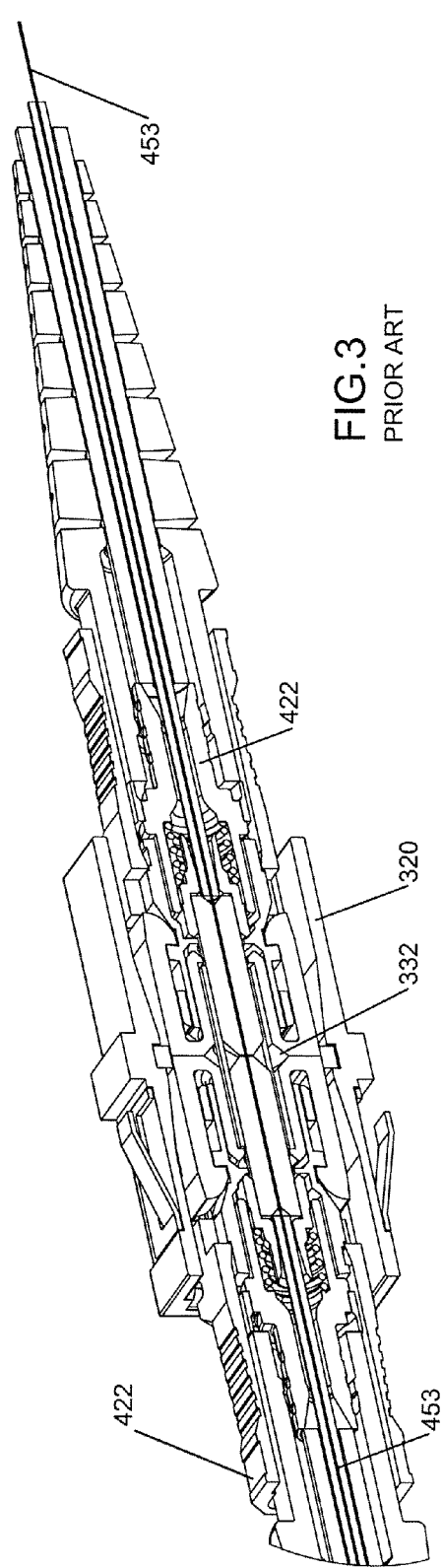
FIG. 3 is a front, top perspective cut-away view cut lengthwise through the two fiber optic connectors of FIG. 1 assembled with the fiber optic adapter of FIG. 1.
Figure 4:
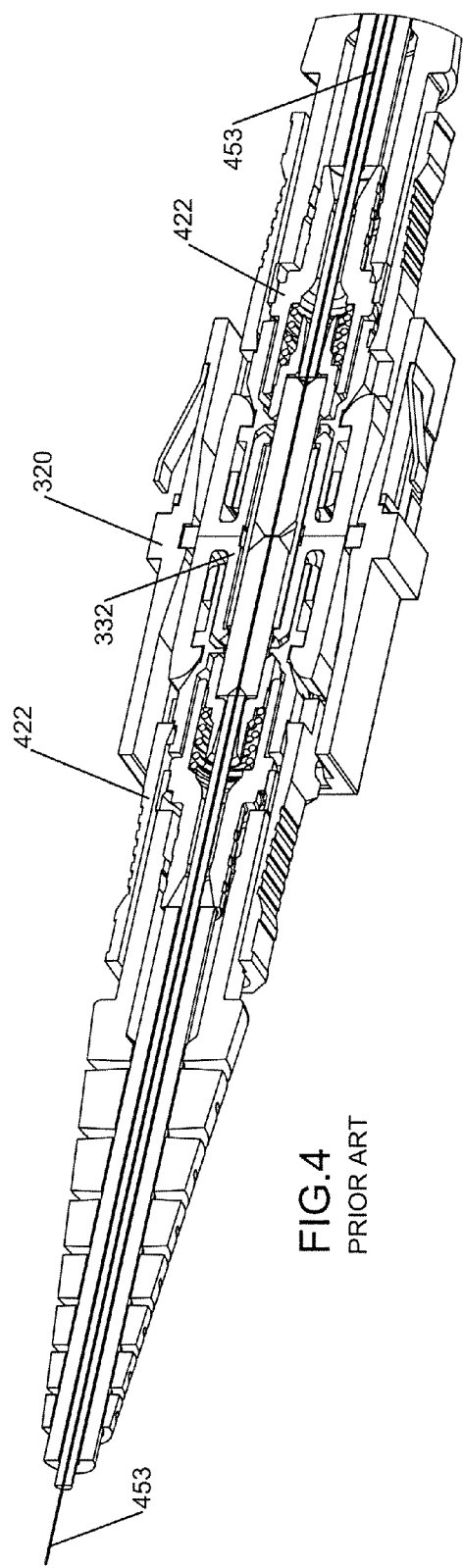
FIG. 4 is a rear, bottom perspective cut-away view cut lengthwise through the two fiber optic connectors of FIG. 1 assembled with the fiber optic adapter of FIG. 1.
Figure 7:
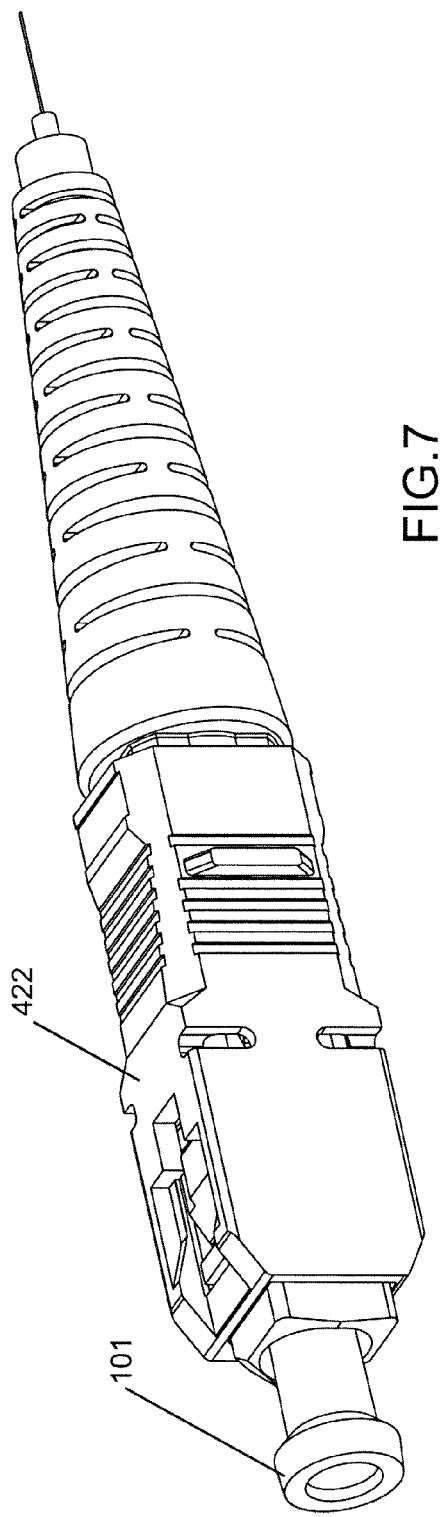
FIG. 7 is a front, top perspective view of the fiber optic connector of FIGS. 1 and 5 with a dust cap installed.
Figure 8:
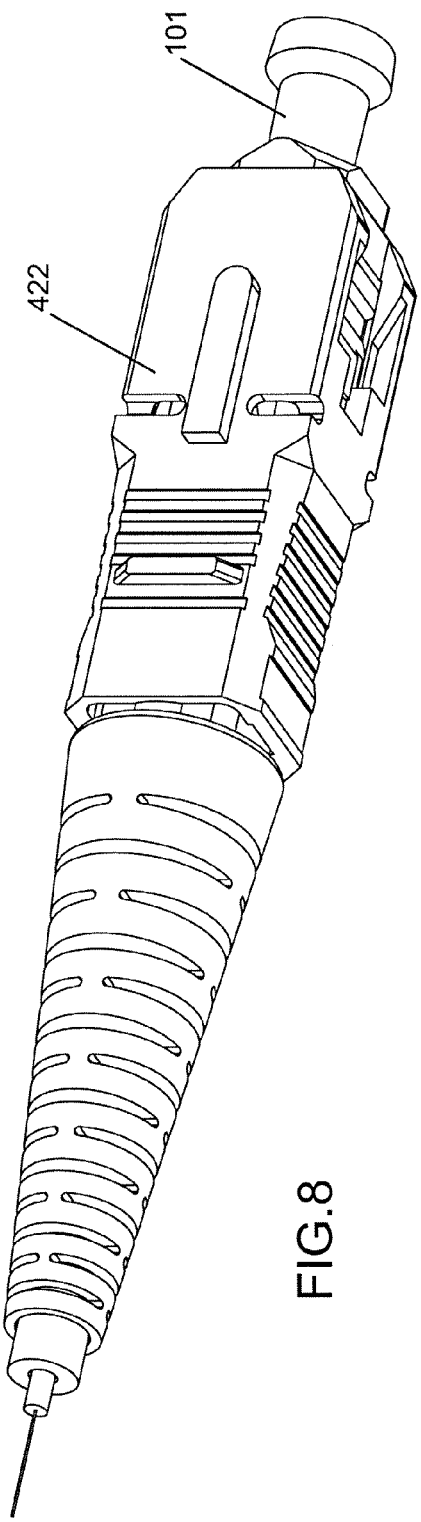
FIG. 8 is a rear, bottom perspective view of the fiber optic connector of FIGS. 1 and 5 with the dust cap of FIG. 7 installed.
Figure 11:
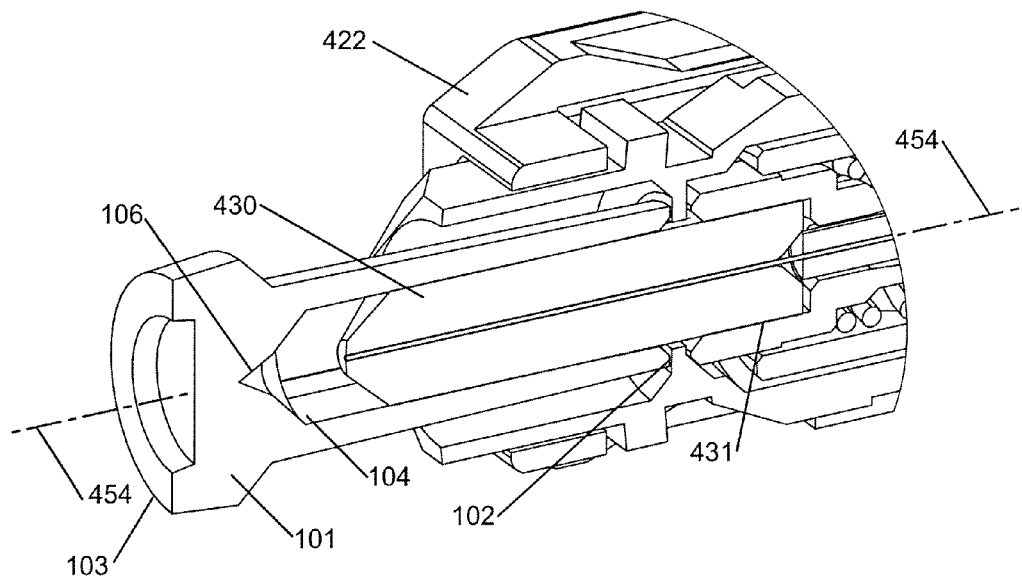
FIG. 11 is a partial, enlarged, front, top perspective cut-away view cut lengthwise through the fiber optic connector of FIGS. 1 and 5 with the dust cap of FIG. 7 installed.
Figure 12:
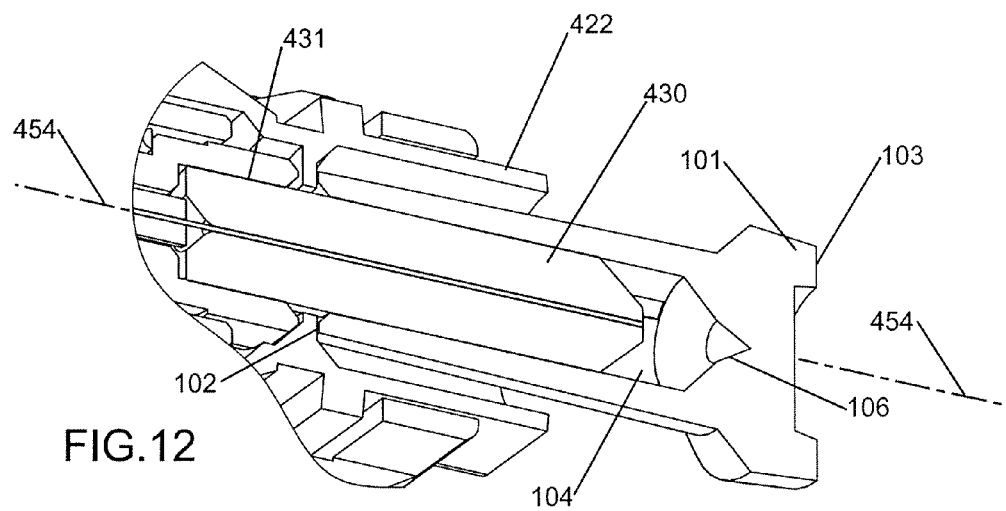
FIG. 12 is a partial, enlarged, rear, bottom perspective cut-away view cut lengthwise through the fiber optic connector of FIGS. 1 and 5 with the dust cap of FIG. 7 installed.

As described above, there is a need for a transparent or translucent dust cap with high power protection 101 for use with fiber optic connectors including the prior art SC style fiber optic connector 422. In addition, there is a need for a transparent or translucent dust plug with high power protection 201 for use with fiber optic adapters including the prior art SC style fiber optic adapter 320. The dust cap 101 and the dust plug 201 satisfy a number of requirements including but not limited to: a) allowing safe, visual fiber optic circuit continuity detection as described above; b) providing protection from high power signals which may be emitted from the fiber optic cable 450 as described above; c) being easily removable and easily installable on the connector 422 or the adapter 320 by hand or with tools; d) maintaining the installed configuration on the connector 422 or the adapter 320 under normal conditions; e) protecting the optical interface on the connector 422 or the adapter 320 from contamination under normal conditions; and f) allowing gas which may be contained within a cavity 109 of the dust cap 101 and a cavity 209 of the dust plug 201 to vent during installation on and removal from the connector 422 and the adapter 320 respectively.

The dust cap 101, illustrated in FIGS. 17 through 20, includes a sleeve 110 with a central axis 105, and a cavity 109 that extends through the sleeve 110 along the central axis 105. The cavity 109 has an open end 102, and a closed end 103. At least a portion of the cavity 109 is defined by an internal diameter 104 sized for receiving an outer diameter 431 of the ferrule 430 of the connector 422. At least one vent channel 112 is defined by the cavity 109 for the purpose of preventing an airtight fit with the ferrule 430. A grip 116 may be provided at or near the closed end 103 for the purpose of handling the dust cap 101 and allowing easy removal and installation. A molding cavity 118 may be provided at or near the closed end 103 to manage material shrinkage during the molding and manufacturing process.

In a preferred embodiment, the internal diameter 104 of the cavity 109 is sized for a frictional fit with the outer diameter 431 of the ferrule 430 of the connector 422. In other embodiments, the dust cap 101 includes other means for maintaining the installed configuration on the connector 422. These means may replace or supplement the frictional fit between the internal diameter 104 and the outer diameter 431. These means include, but are not limited to, a) a threaded connection, b) a non-permanent adhesive, and c) resilient latches, similar to the resilient latches 340 and 342 of the adapter 320.

The dust plug 201, illustrated in FIGS. 33 through 36, includes a flange 207 with a sleeve 210 extending from a first side of the flange 207 along a central axis 205 (perpendicular to the flange 207). A cavity 209 within the sleeve 210 extends along the central axis 205 from an open end 202 to an opposite closed end 203. At least one detent 204 is positioned along an outer portion 211 of the sleeve 210 for the purpose of engaging the resilient latches 340 or 342 of the adapter 320. The outer portion 211 of the sleeve 210 is sized to fit within the ports 324 or 326 of the adapter 320 with sufficient clearance to be non-airtight. A grip 216 may be provided on a second side of the flange 207 for the purpose of handling the dust plug 201 and allowing easy removal and installation. At least one molding cavity 218 may be provided at or near the closed end 203 to manage material shrinkage during the molding and manufacturing process.

In other embodiments, the dust plug 201 includes other means for maintaining the installed configuration on the adapter 320. These means may replace or supplement the detents 204 that engage the resilient latches 340 or 342 of the adapter 320. These means include, but are not limited to, a) a threaded connection, b) a non-permanent adhesive, and c) a frictional fit between the outer portion 211 of the sleeve 210 and the ports 324 and 326 of the adapter 320.

The aforementioned goal of allowing safe, visual fiber optic circuit continuity detection with high power protection is achieved in various embodiments disclosed herein. The various embodiments are most effective with proper installation of the dust cap 101 on the connector 422 and the dust plug 201 in the adapter 320.

Except for the installation method and certain interface details, the techniques involved are similar between the dust cap 101 and the dust plug 201. Therefore, when practical, the dust cap 101 and the dust plug 201 will be discussed together.

Proper installation of the dust cap 101 on the connector 422 involves placing the open end 102 (see FIGS. 17 through 20) of the dust cap 101 over the ferrule 430 of the connector 422, as shown in FIGS. 7 through 12. A tapered area 429 at the tip of the ferrule 430 and a chamfer 113 on the open end 102 of the dust cap 101 may be used as guides to center the cavity 109 over the ferrule 430. The frictional fit between the inside diameter 104 of the dust cap 101 and the outside diameter 431 of the ferrule 430 provides a retention means to maintain the dust cap 101 at the proper position along the ferrule 430 under normal conditions.

Proper installation of the dust plug 201 in the adapter 320 involves placing the open end 202 (see FIGS. 33 through 36) of the dust plug 201 within either of the open ports 324 or 326 of the adapter 320, as illustrated in FIGS. 29 through 32. The dust plug 201 must be rotationally indexed such that its detents 204 are aligned with the resilient latches 340 or 342 of the adapter 320. A lead-in 344 on the resilient latches 340 and 342 serve as guides to center the dust plug 201 within the port 324 or 326 during installation. The resilient latches 340 or 342, engaging with the detents 204, provide a retention mechanism to maintain the dust plug 201 at the proper position within the port 324 or 326 under normal conditions.

One of the aforementioned embodiments involves using the dust cap 101 and the dust plug 201 to refract the light beam emitted from the fiber 453. An angled surface, angled relative to the central axis 105 and 205, is formed or placed within the cavity 109 of the dust cap 101 and the cavity 209 of the dust plug 201. When the dust cap 101 and the dust plug 201 are properly installed, the light beam emitted from the fiber 453 illuminates an area entirely within the angled surface. A transparent or translucent material of a desired index of refraction is chosen for the dust cap 101 and the dust plug 201 in conjunction with the angle of the angled surface relative to the central axis 105 and 205. In a preferred embodiment, the dust cap 101 and the dust plug 201 are made from a polycarbonate material such as LEXAN® 920-NC. In a preferred embodiment, an angled surface defines a cone 106 with an angle, α, in the range of 15 to 80 degrees relative to the central axis 105 of the dust cap 101 (see FIG. 20) and another angled surface defines a cone 206 with an angle, β, in the range of 15 to 80 degrees relative to the central axis 205 of the dust plug 201 (see FIG. 36). In the preferred embodiment, an additional angled surface defines a second cone 108 with an angle, γ, in the range of 45 to 90 degrees relative to the central axis 105 of the dust cap 101 and another additional angled surface defines a second cone 208 with an angle, δ, in the range of 45 to 90 degrees relative to the central axis 205 of the dust plug 201. The second cone 108 and the second cone 208 are provided for geometric clearance in certain assembled configurations.

Figure 13:
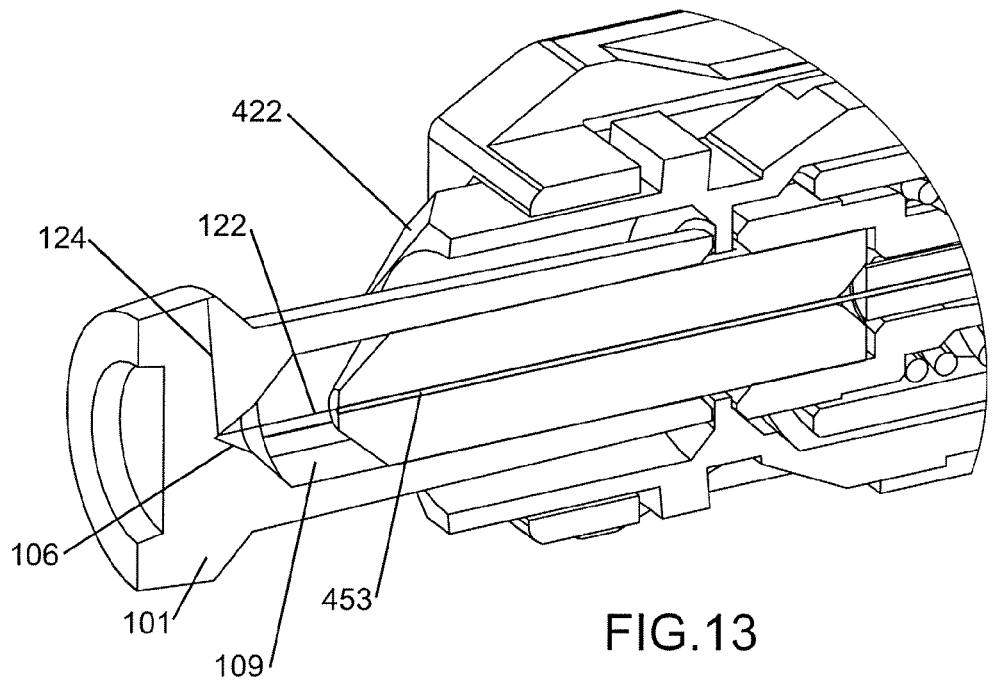
FIG. 13 is a partial, enlarged, front, top perspective cut-away view cut lengthwise through the fiber optic connector of FIGS. 1 and 5 illustrating a ray of light being refracted through an installed dust cap.
Figure 14:
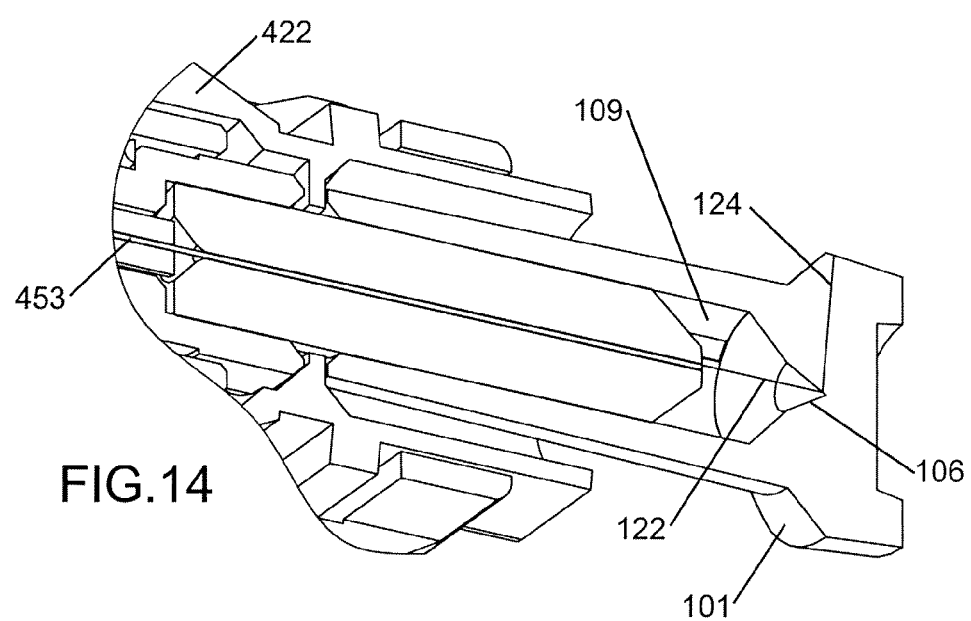
FIG. 14 is a partial, enlarged, rear, bottom perspective cut-away view cut lengthwise through the fiber optic connector of FIGS. 1 and 5 illustrating a ray of light being refracted through the installed dust cap of FIG. 13.

As illustrated in FIGS. 13 and 14 a ray of light 122 (a portion of the light beam), emitted from the fiber 453, illuminates a portion of the cone 106 and a portion of the ray 124 is refracted through the dust cap 101 at an angle relative to the central axis 105. Another portion of the ray (not shown) is reflected back toward the cavity 109 of the dust cap 101. The refraction, together with the reflection and the geometry of the cone 106, serve to reduce the intensity of the light emitted through the dust cap 101 to a safe level. In addition, at least portions of the exterior of the dust cap 101 become illuminated by the refracted light. An illuminated dust cap 101 indicates that the fiber optic signal is reaching that point in the fiber optic circuit or fiber optic network. In essence, the dust cap 101 functions as a safe, visual fiber optic circuit continuity detector in addition to providing protection from high power signals.

In a similar manner to the preceding paragraph, a ray of light, emitted from the fiber 453 toward the dust plug 201 in the assembly shown in FIGS. 29 through 32 will illuminate a portion of the cone 206. A portion of the ray will refract through the dust plug 201 at an angle relative to the central axis 105 and another portion of the ray will be reflected back toward the cavity 209 of the dust plug 201. The refraction, together with the reflection and the geometry of the cone 206, serve to reduce the intensity of the light emitted through the dust plug 201 to a safe level. In addition, at least portions of the exterior of the dust plug 201 will become illuminated by the refracted light. An illuminated dust plug 201 indicates that the fiber optic signal is reaching that point in the fiber optic circuit or fiber optic network. In essence, the dust plug 201 functions as a safe, visual fiber optic circuit continuity detector in addition to providing protection from high power signals.

In addition to refraction and reflection, the above embodiment may employ other optical effects that include, but are not limited to, total internal reflection and dispersion.

Another of the aforementioned embodiments involves using the dust cap 101 and the dust plug 201 to disburse the light beam being emitted from the fiber 453.

Figure 22:
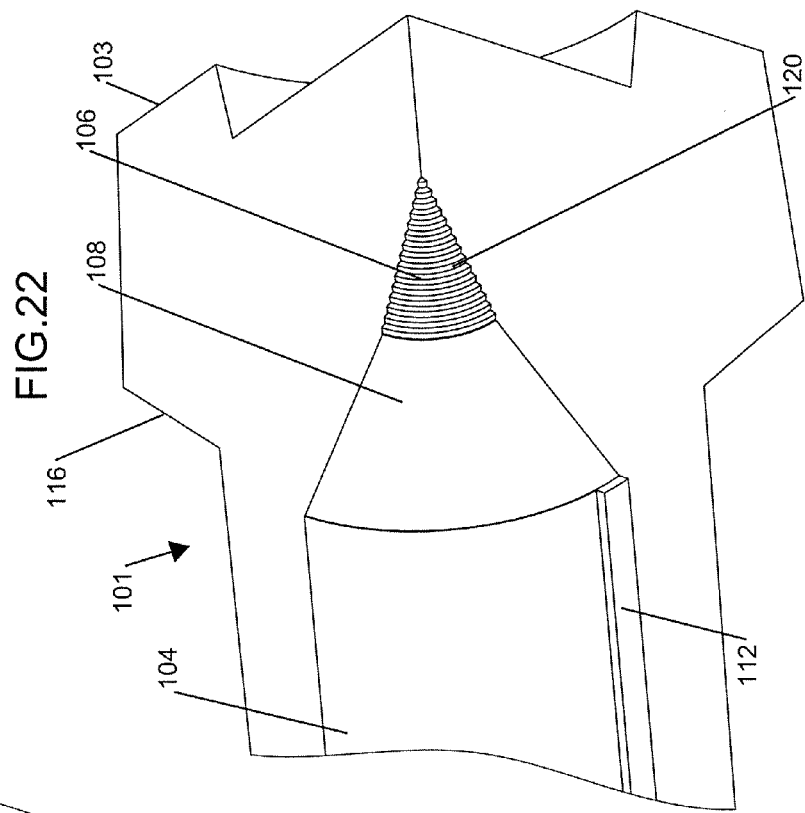
FIG. 22 is a greatly enlarged, partial, perspective cut-away view cut lengthwise through and quartering the dust cap of FIG. 7 and illustrating a uniform pattern forming a textured light disbursing surface.
Figure 21:
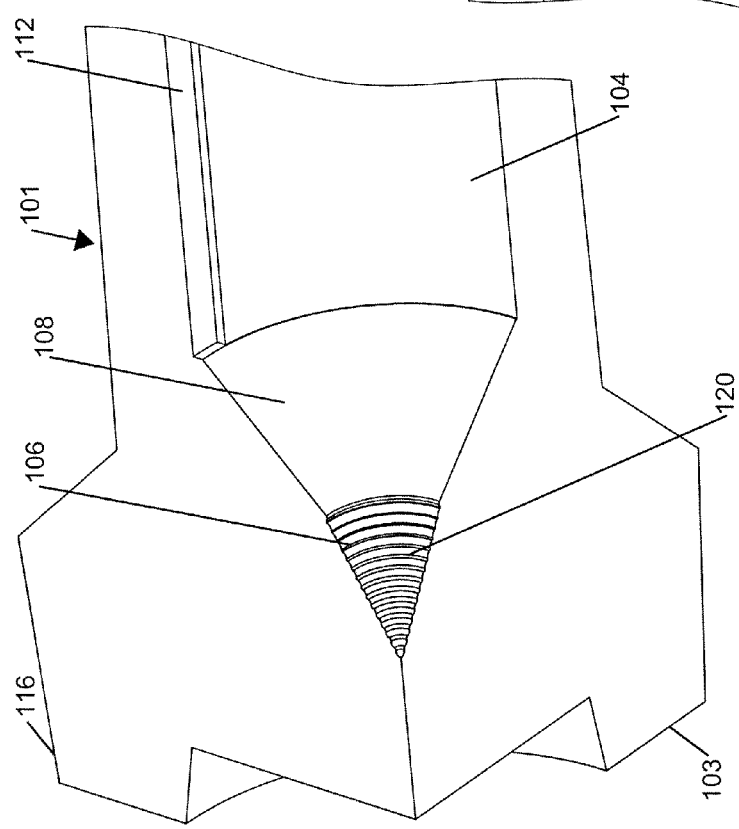
FIG. 21 is a greatly enlarged, partial, perspective cut-away view cut lengthwise through and quartering the dust cap of FIG. 7 and illustrating a regularly varying pattern forming a textured light disbursing surface.
Figure 23:
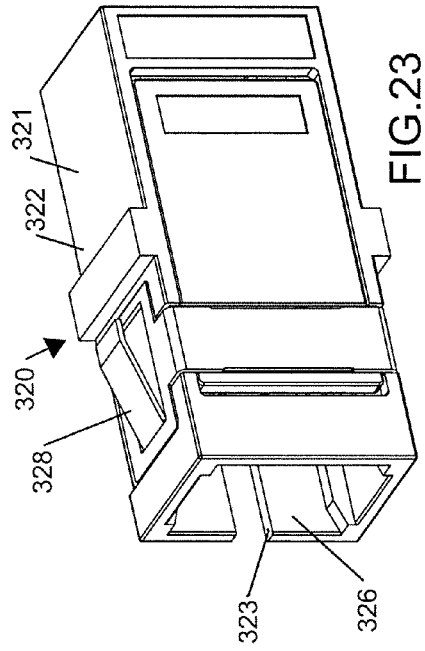
FIG. 23 is a front, top perspective view of the prior art SC style fiber optic adapter of FIG. 1 with a first port and a second port both open.
Figure 25:
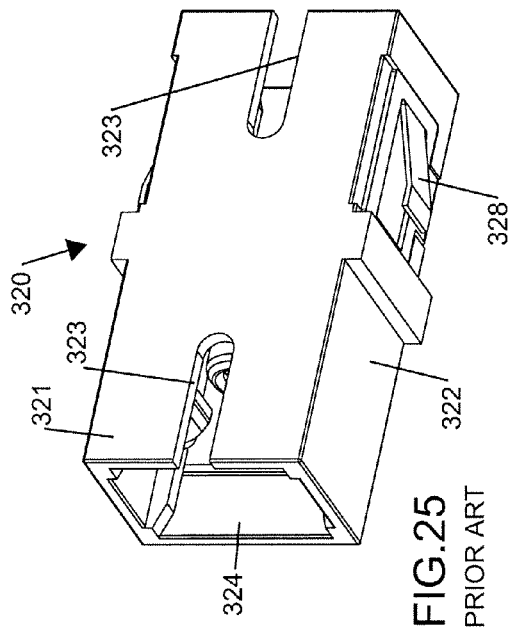
FIG. 25 is a rear, bottom perspective view of the fiber optic adapter of FIGS. 1 and 23.
Figure 24:
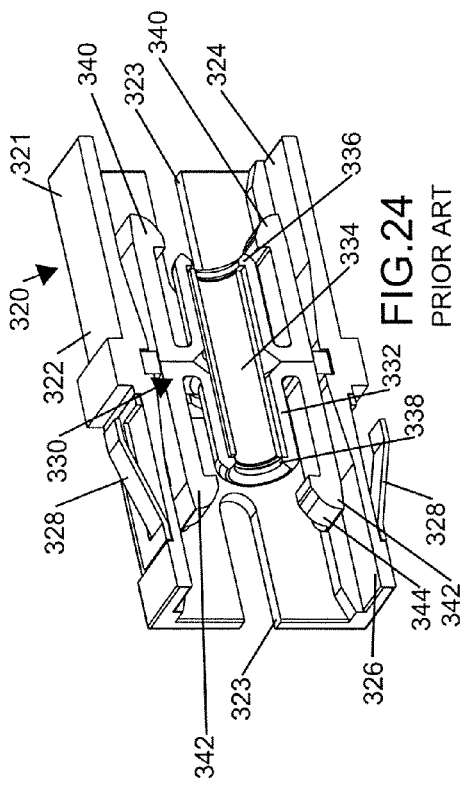
FIG. 24 is a front, top perspective cut-away view cut lengthwise through the fiber optic adapter of FIGS. 1 and 23.
Figure 26:
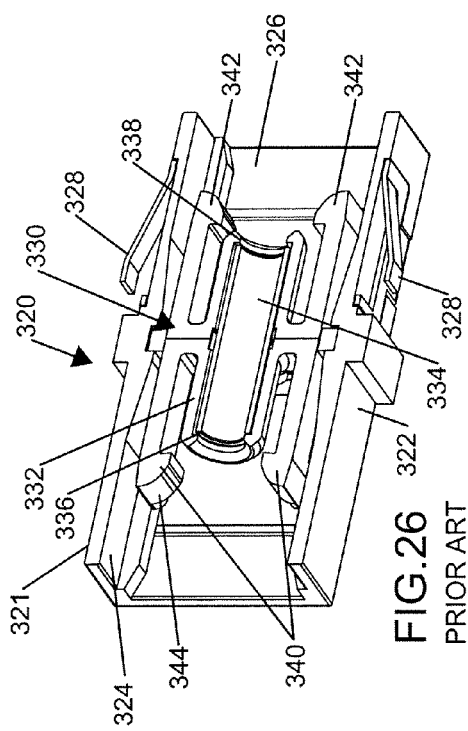
FIG. 26 is a rear, bottom perspective cut-away view cut lengthwise through the fiber optic adapter of FIGS. 1 and 23.
Figure 27:
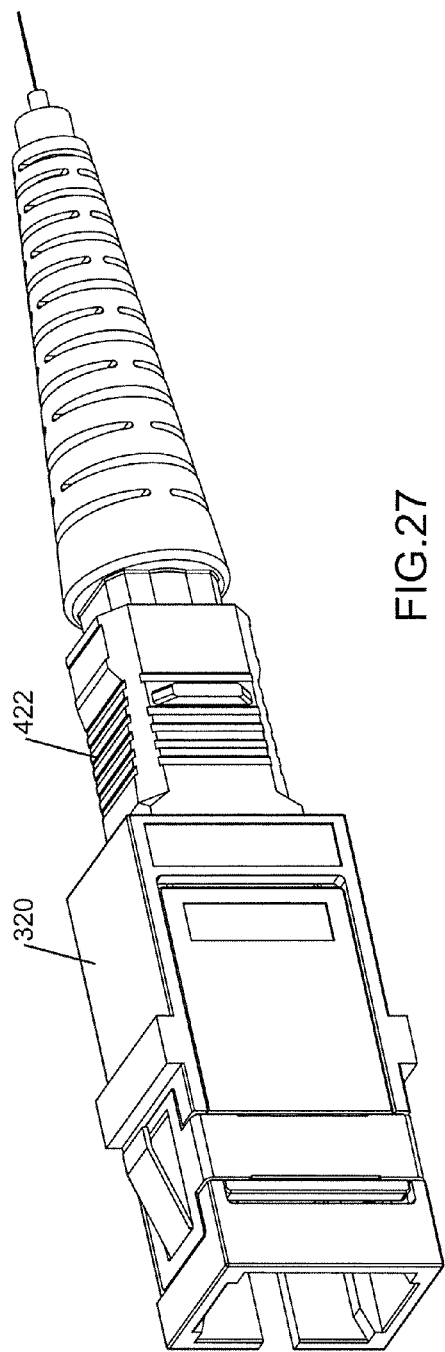
FIG. 27 is a front, top perspective view of the fiber optic adapter of FIGS. 1 and 23 with the prior art SC style fiber optic connector of FIGS. 1 and 5 inserted into the first port and the second port remaining open.
Figure 28:
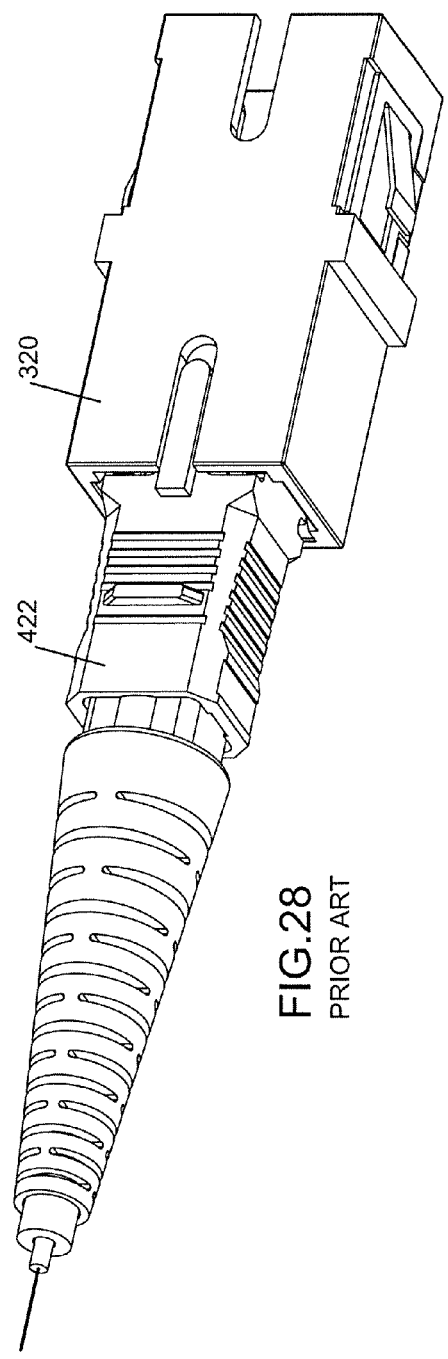
FIG. 28 is a rear, bottom perspective view of the fiber optic adapter of FIGS. 1, 23, and 27 with the fiber optic connector of FIGS. 1, 5, and 27 inserted into the first port and the second port remaining open.
Figure 29:
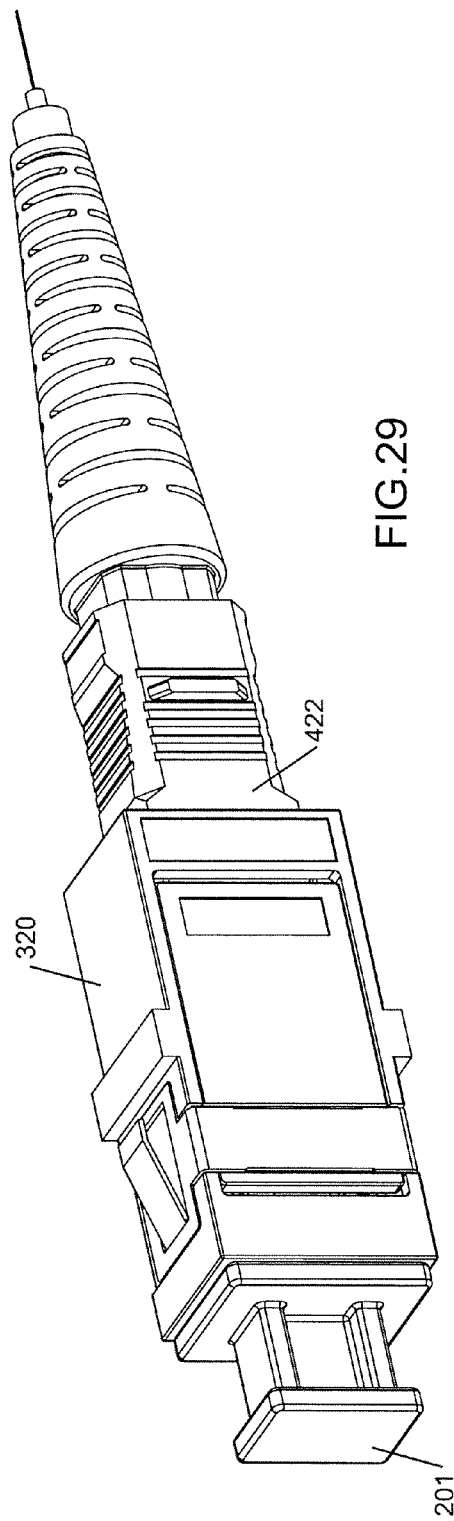
FIG. 29 is a front, top perspective view of the fiber optic adapter of FIGS. 1, 23, and 27 with the fiber optic connector of FIGS. 1, 5, and 27 inserted into the first port and a dust plug inserted into the second port.
Figure 30:
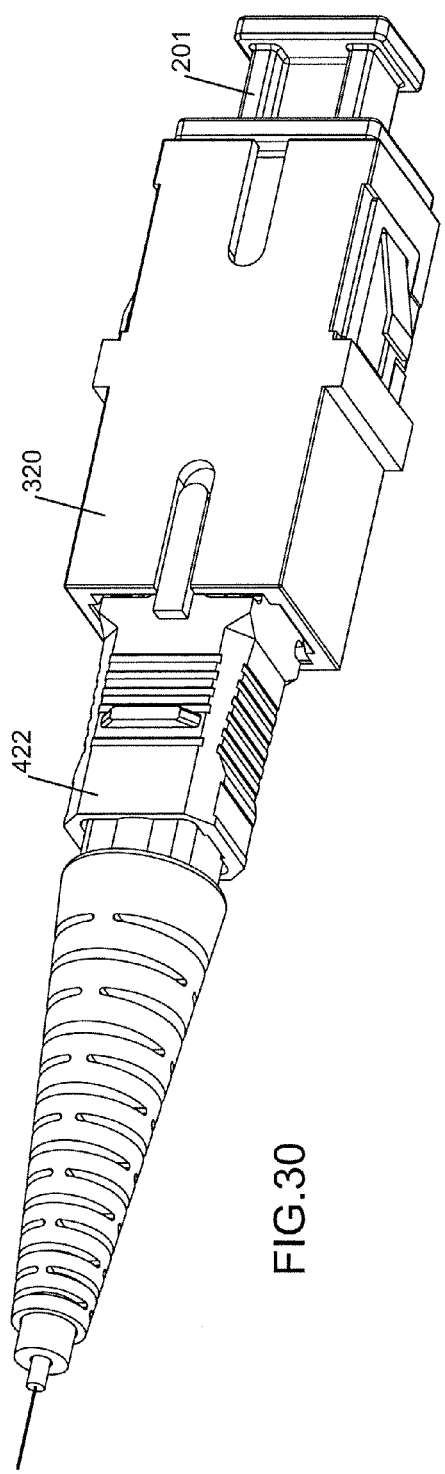
FIG. 30 is a rear, bottom perspective view of the fiber optic adapter of FIGS. 1, 23, and 27 with the fiber optic connector of FIGS. 1, 5, and 27 inserted into the first port and the dust plug of FIG. 29 inserted into the second port.
Figure 31:
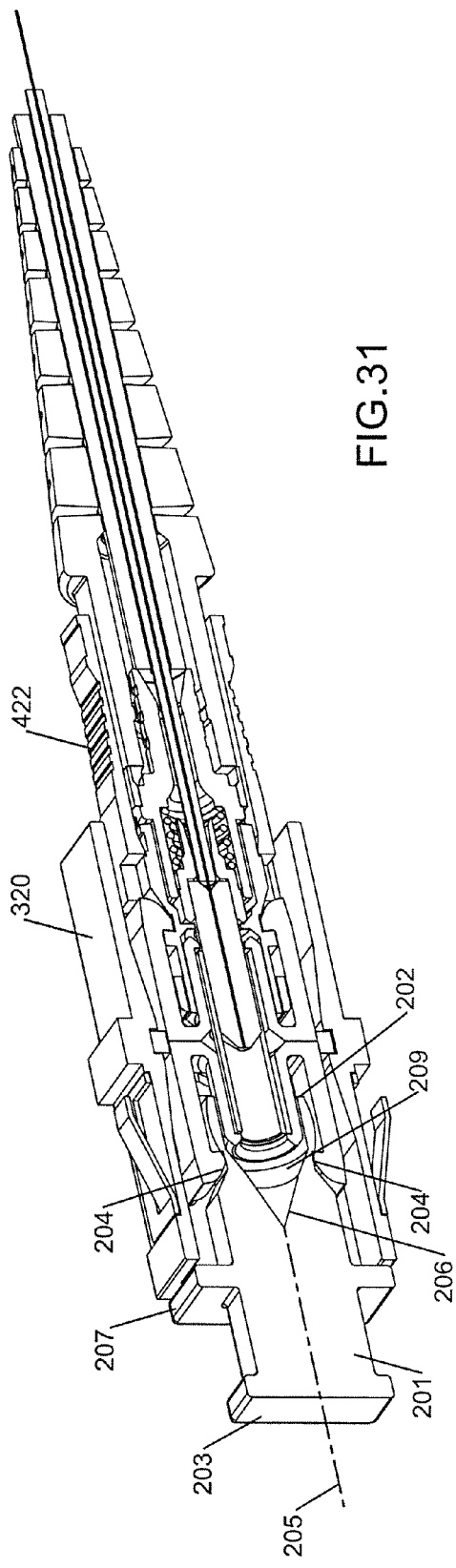
FIG. 31 is a front, top perspective cut-away view cut lengthwise through the fiber optic adapter of FIGS. 1, 23, and 27 with the fiber optic connector of FIGS. 1, 5, and 27 inserted into the first port and the dust plug of FIG. 29 inserted into the second port.
Figure 32:
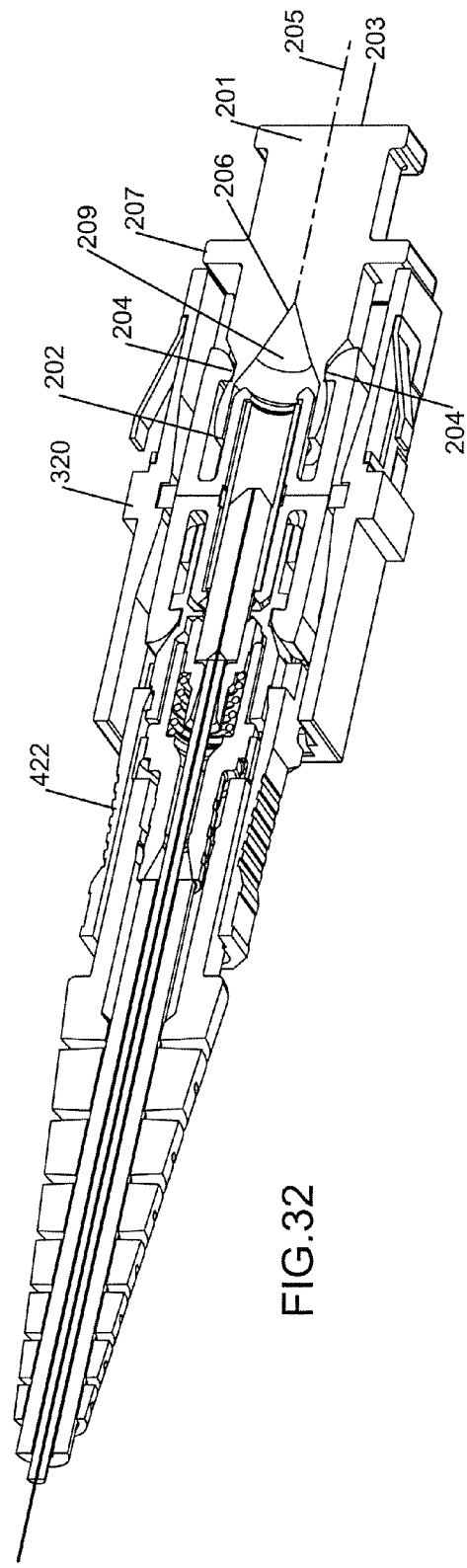
FIG. 32 is a rear, bottom perspective cut-away view cut lengthwise through the fiber optic adapter of FIGS. 1, 23, and 27 with the fiber optic connector of FIGS. 1, 5, and 27 inserted into the first port and the dust plug of FIG. 29 inserted into the second port.
Figure 33:
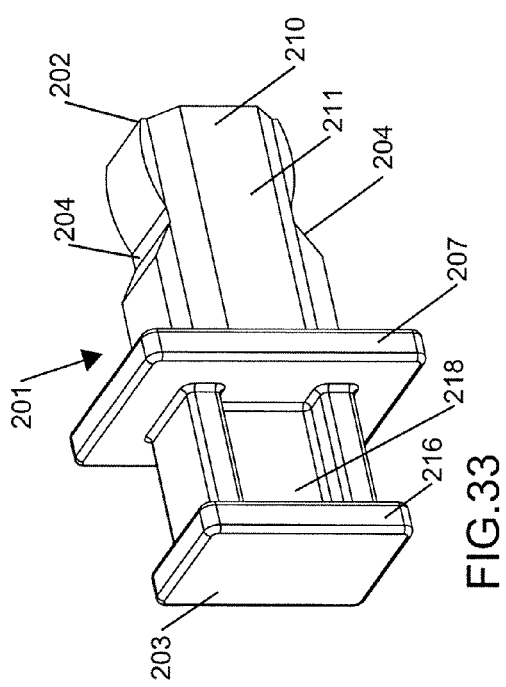
FIG. 33 is a front, top perspective view of the dust plug of FIG. 29.
Figure 34:
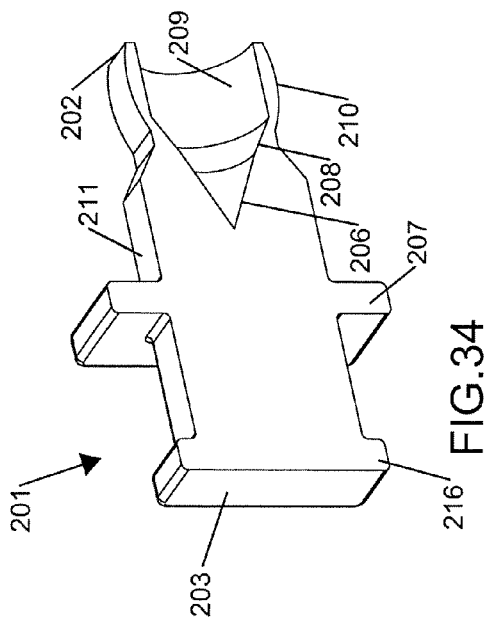
FIG. 34 is a front, top perspective cut-away view cut lengthwise through the dust plug of FIG. 29.
Figure 35:
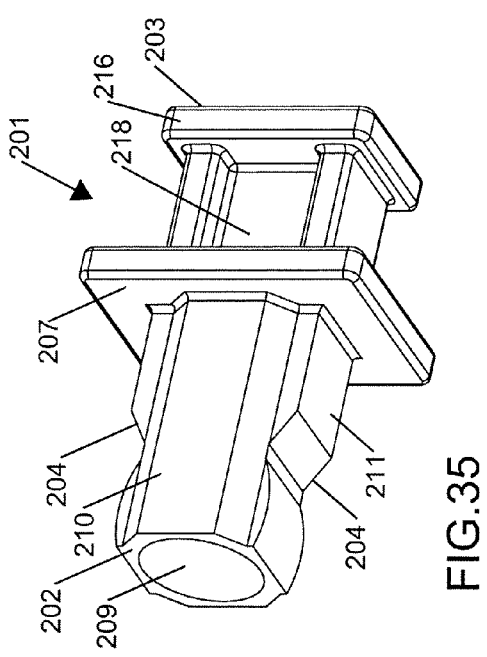
FIG. 35 is a rear, bottom perspective view of the dust plug of FIG. 29.
Figure 36:
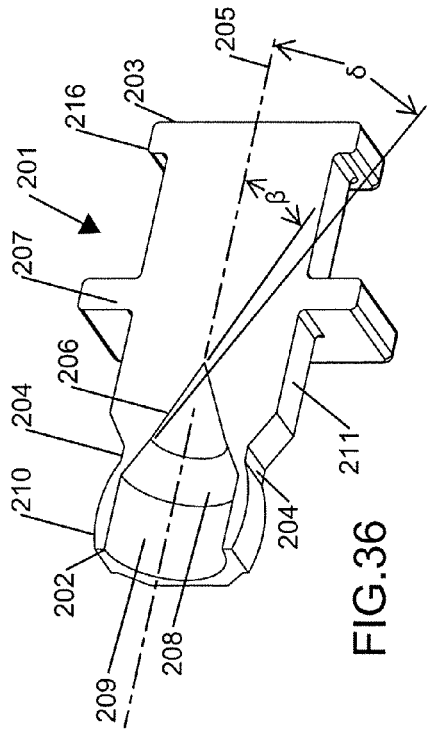
FIG. 36 is a rear, bottom perspective cut-away view cut lengthwise through the dust plug of FIG. 29.

A textured light disbursing surface 120 is formed or placed within the cavity 109 of the dust cap 101 and the cavity 209 of the dust plug 201. When the dust cap 101 and the dust plug 201 are properly installed, the light beam emitted from the fiber 453 illuminates an area entirely within the textured light disbursing surface 120. In a preferred embodiment, the textured light disbursing surface 120 has features sized between 0.001 and 0.003 inch. In other embodiments, the feature sizes are less than 0.001 inch and greater than 0.003 inch. In a preferred embodiment, the light disbursing features have a random placement. In a preferred embodiment, the light disbursing features take the form of projections and depressions, peaks and valleys, and may include surface discontinuities. In other embodiments, the features are part of a uniform non-varying pattern, a regularly varying pattern, or a combination of several patterns and/or random placements. As an example, FIG. 21 illustrates a regularly varying pattern with circumferential features varying along the axial direction of the cone. As another example, FIG. 22 illustrates a uniform pattern with circumferential features along the axial direction of the cone. Other patterns may be uniform or vary along other directions. In a preferred embodiment, the textured light disbursing surface 120 has an overall conical shape. In other embodiments, the surface has an overall planar shape. In still other embodiments, the surface has an overall non-planar and non-conical shape. In a preferred embodiment, the textured light disbursing surface 120 defines a cone 106 with an angle, α, in the range of 15 to 80 degrees relative to the central axis 105 of the dust cap 101 (see FIG. 20) and another textured light disbursing surface defines a cone 206 with an angle, β, in the range of 15 to 80 degrees relative to the central axis 205 of the dust plug 201 (see FIG. 36). In a preferred embodiment, an additional surface defines a second cone 108 with an angle, γ, in the range of 45 to 90 degrees relative to the central axis 105 of the dust cap 101 and another additional surface defines a second cone 208 with an angle, δ, in the range of 45 to 90 degrees relative to the central axis 205 of the dust plug 201. The second cone 108 and the second cone 208 are provided for geometric clearance in certain assembled configurations.

Figure 15:
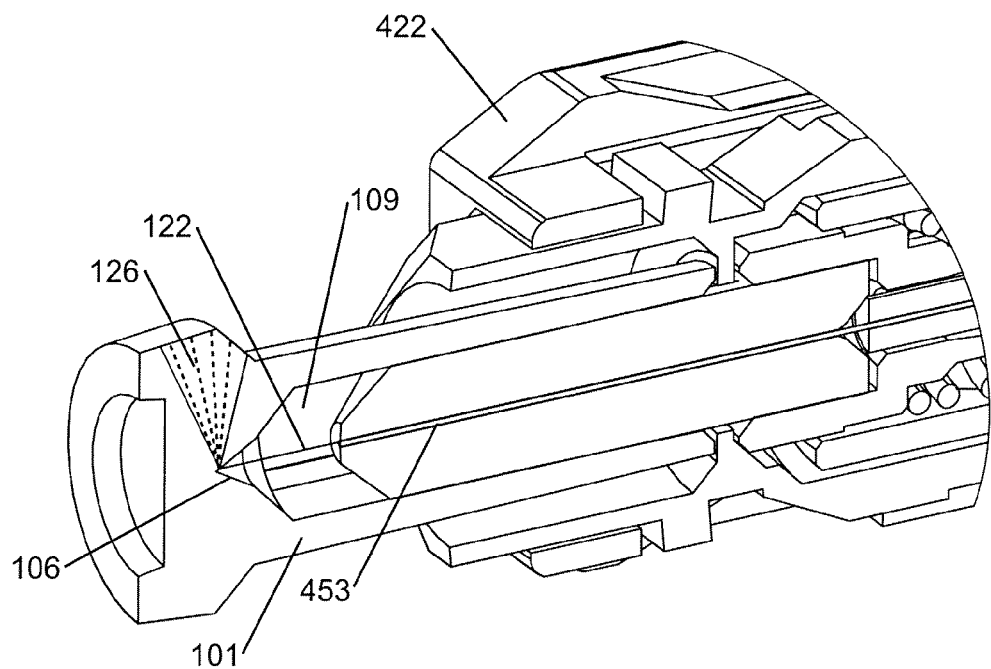
FIG. 15 is a partial, enlarged, front, top perspective cut-away view cut lengthwise through the fiber optic connector of FIGS. 1 and 5 illustrating a ray of light being disbursed through an installed dust cap.
Figure 16:
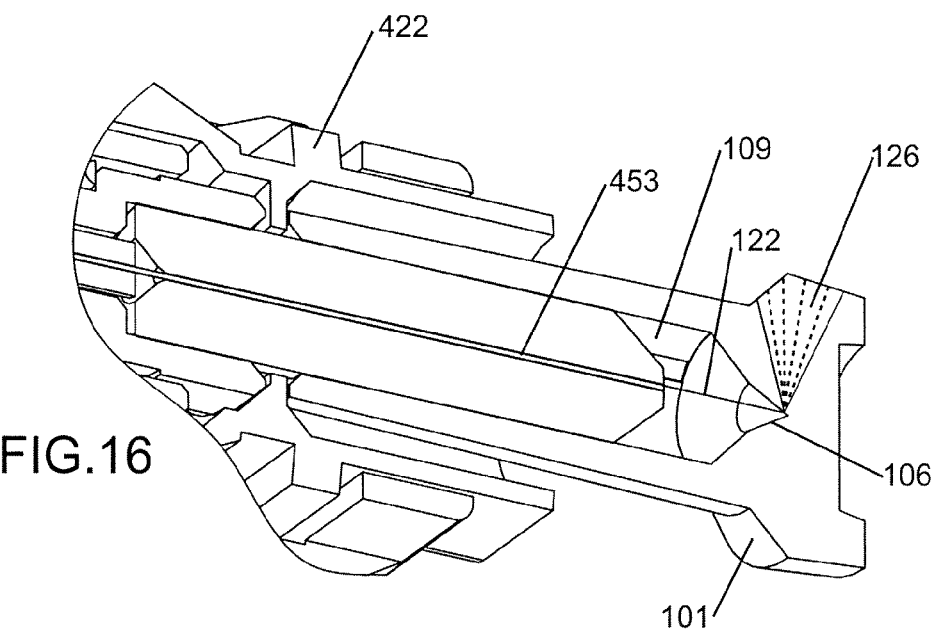
FIG. 16 is a partial, enlarged, rear, bottom perspective cut-away view cut lengthwise through the fiber optic connector of FIGS. 1 and 5 illustrating a ray of light being disburse through the installed dust cap of FIG. 15.

In a preferred embodiment, the textured light disbursing surface 120 is formed by first producing a mold and chemically etching the mold surface. The mold is then used to produce the textured light disbursing surface 120. In other embodiments, the mold creating the textured light disbursing surface 120 may be treated by other methods including photo-chemical etching, sand-blasting, and machining In yet other embodiments, the textured light disbursing surface 120 may be created directly on the dust cap 101 and dust plug 201 by a variety of methods including chemical etching, photo-chemical etching, sand-blasting, and machining The optical effects employed by the textured light disbursing surface 120 may include but are not limited to diffraction, refraction, reflection, dispersion, and total internal reflection. As illustrated in FIGS. 15 and 16 a ray of light 122 (a portion of the light beam), emitted from the fiber 453, illuminates a portion of the textured light disbursing surface 120 of the cone 106 and a portion of the ray 126 is disburse through the dust cap 101. Another portion of the ray (not shown) is reflected back toward the cavity 109 of the dust cap 101. The disbursing, together with the reflection and the geometry of the cone 106, serve to reduce the intensity of the light emitted through the dust cap 101 to a safe level. In addition, at least portions of the exterior of the dust cap 101 become illuminated by the disbursed light. An illuminated dust cap 101 indicates that the fiber optic signal is reaching that point in the fiber optic circuit or fiber optic network. In essence, the dust cap 101 functions as a safe, visual fiber optic circuit continuity detector in addition to providing protection from high power signals.

In a similar manner to the preceding paragraph, a ray of light, emitted from the fiber 453 toward the dust plug 201 in the assembly shown in FIGS. 29 through 32 will illuminate a portion of the textured light disbursing surface 120 of the cone 206. A portion of the ray will disburse through the dust plug 201 and another portion of the ray will be reflected back toward the cavity 209 of the dust plug 201. The disbursing, together with the reflection and the geometry of the cone 206, serve to reduce the intensity of the light emitted through the dust plug 201 to a safe level. In addition, at least portions of the exterior of the dust plug 201 will become illuminated by the disbursed light. An illuminated dust plug 201 indicates that the fiber optic signal is reaching that point in the fiber optic circuit or fiber optic network. In essence, the dust plug 201 functions as a safe, visual fiber optic circuit continuity detector in addition to providing protection from high power signals.

Yet another embodiment, that allows safe, visual fiber optic circuit continuity detection is achieved by using a chemical or chemicals which selectively absorb certain high power frequencies of light while transmitting other low power visible frequencies. The high power and low power frequencies of light may be present in the circuit simultaneously or at different times. The high power and low power frequencies used in a specific fiber optic network and related equipment are matched by the choice of the chemicals. The dust cap 101 and the dust plug 201 may be made from a material doped with such chemicals. Alternatively, one or more surfaces of the dust cap 101 and the dust plug 201 may be coated with such chemicals.

A particular example concerns certain fiber optic signals generated by high-power (above 0.25 Watt) infrared lasers. The human eye cannot see these infrared signals but can be damaged by them at high intensities produced by high-power lasers. Thus, visual fiber optic circuit continuity detection cannot be done in fiber optic circuits employing only infrared lasers. In such circuits, visual continuity detection can be preformed by substituting or inserting a low power continuity laser that emits a particular frequency of visible light. At least portions of the exterior of the dust cap 101 or the dust plug 201 will be illuminated by the visible light from the continuity laser by making the dust cap 101 and the dust plug 201 from a material which transmits the particular frequency. The dust cap 101 and the dust plug 201, which selectively absorb any infrared signals, function as a safe, visual fiber optic circuit continuity detector in conjunction with the continuity laser. In addition, the dust cap 101 and the dust plug 201 provide protection from high power infrared signals. The dust cap 101 and the dust plug 201 in this example are made from or coated with a material doped with a chemical which absorbs infrared light and transmits visible light.

A description of certain chemicals with properties useful in the above example are described in the periodical publication, *Pure and Applied Chemistry*, Vol. 76, Nos. 7-8, dated 2004, pages 1435-1443, in an article titled "Near-infrared Absorbing Organic Materials" by Zhi Yuan Wang et al.

In the present disclosure, the term "light" includes infrared light, visible light, and ultraviolet light.

From the forgoing detailed description, it will be evident that modifications and variations can be made in the devices of the disclosure without departing from the spirit or scope of the invention.

What is claimed is:

1. A dust cap for use with an optical fiber connector, the optical fiber connector having a ferrule with an outer diameter, the dust cap comprising:
   a sleeve having a central axis, the sleeve defining a cavity for receiving at least a portion of the ferrule, the cavity extending along the central axis of the sleeve and having an open end positioned opposite from a closed end, at least a portion of the cavity defining an internal diameter sized for receiving the outer diameter of the ferrule, the sleeve also including a textured light disbursing surface positioned within the cavity at the closed end of the cavity for disbursing light that is transmitted through the ferrule into the cavity of the dust cap;
   wherein the textured light disbursing surface is set at an angle to the central axis of the sleeve, the textured light disbursing surface not being capable of focusing light; and
   wherein the light is disbursed radially relative to the central axis of the sleeve and thereby illuminates at least a portion of an exterior of the dust cap facing radially away from the central axis.

2. The dust cap of claim 1, wherein the sleeve is made from a transparent material.

3. The dust cap of claim 1, wherein the sleeve is made from a translucent material.

4. The dust cap of claim 1, wherein the textured light disbursing surface includes a plurality of peaks and valleys.

5. The dust cap of claim 1, wherein the textured light disbursing surface includes a plurality of projections.

6. The dust cap of claim 1, wherein the angle is in a range of 15 to 80 degrees.

7. The dust cap of claim 1, wherein the textured light disbursing surface defines a first conical shape.

8. The dust cap of claim 7, wherein the first conical shape has a central axis that is aligned with the central axis of the sleeve.

9. The dust cap of claim 8, wherein the sleeve defines a second conical shape within the cavity, the second conical shape being positioned between the first conical shape and the open end of the cavity, the second conical shape defining a central axis that is aligned with the central axis of the first conical shape.

10. The dust cap of claim 1, further comprising a dopant provided in the sleeve for absorbing light of a selected frequency.

11. A dust plug for use with an optical fiber adapter, the dust plug comprising:
    a flange;
    a sleeve that projects outwardly from the flange in a first direction, the sleeve defining an interior cavity with a central axis;
    a handle that projects outwardly from the flange in a second direction, the second direction being opposite from the first direction; and
    a textured light disbursing surface positioned within the interior cavity of the sleeve for disbursing light that is transmitted through the optical fiber adapter into the interior cavity of the sleeve of the dust plug;
    wherein the textured light disbursing surface is set at an angle to the central axis of the interior cavity, the textured light disbursing surface not being capable of focusing light; and
    wherein the light is disbursed radially relative to the central axis of the interior cavity and thereby illuminates at least a portion of an exterior of the dust plug.

12. The dust plug of claim 11, wherein the sleeve includes an external surface defining at least one detent.

13. The dust plug of claim 11, wherein the sleeve is made from a translucent material.

14. The dust plug of claim 11, wherein the textured light disbursing surface includes a plurality of peaks and valleys.

15. The dust plug of claim 11, wherein the textured light disbursing surface includes a plurality of projections.

16. The dust plug of claim 11, wherein the angle is in a range of 15 to 80 degrees.

17. The dust plug of claim 11, wherein the textured light disbursing surface defines a first conical shape.

18. The dust plug of claim 17, wherein the first conical shape has a central axis that is aligned with the central axis of the sleeve.

19. A dust cap for use with an optical fiber connector, the optical fiber connector having a ferrule, the dust cap comprising:
    a grip;
    a sleeve that projects outwardly from the grip, the sleeve defining a cavity, and the sleeve being constructed of a material through which visible light can be transmitted, the cavity of the sleeve adapted for receiving at least a portion of the ferrule; and
    a light refracting surface positioned within the cavity of the sleeve for angling light that is transmitted through the light refracting surface relative to a central axis of the sleeve, the light refracting surface being angled relative to the central axis of the sleeve, and the light refracting surface not being capable of focusing light.

20. The dust cap of claim 19, wherein the sleeve is made from a translucent material.

* * * * *